US008127130B2

(12) United States Patent
Ellis

(10) Patent No.: US 8,127,130 B2
(45) Date of Patent: Feb. 28, 2012

(54) METHOD AND SYSTEM FOR SECURING DATA UTILIZING RECONFIGURABLE LOGIC

(75) Inventor: Jonathan William Ellis, Austin, TX (US)

(73) Assignee: Advanced Communication Concepts, Inc., Austin, TX (US)

( * ) Notice: Subject to any disclaimer, the term of this patent is extended or adjusted under 35 U.S.C. 154(b) by 842 days.

(21) Appl. No.: 11/405,995

(22) Filed: Apr. 18, 2006

(65) Prior Publication Data

US 2007/0255941 A1 Nov. 1, 2007

(51) Int. Cl.
*H04L 29/06* (2006.01)
(52) U.S. Cl. ....................................................... 713/151
(58) Field of Classification Search .................... None
See application file for complete search history.

(56) References Cited

U.S. PATENT DOCUMENTS

| 5,222,137 A * | 6/1993 | Barrett et al. ................. 380/271 |
| 2003/0028786 A1 * | 2/2003 | Mustafa ........................ 713/189 |
| 2005/0169468 A1 * | 8/2005 | Fahrny et al. ................. 380/210 |
| 2006/0136718 A1 * | 6/2006 | Moreillon ..................... 713/155 |
| 2006/0198367 A1 * | 9/2006 | Lee et al. ...................... 370/389 |

* cited by examiner

*Primary Examiner* — Brandon Hoffman
(74) *Attorney, Agent, or Firm* — Kahler Anderson, PLLC

(57) ABSTRACT

A method is provided for securing data sets by dynamically hopping amongst a variety of data encryption and/or manipulation protocols. Such dynamic protocol hopping can be implemented in reconfigurable logic, or some combination of reconfigurable logic and fixed circuitry or software. The encryption and/or manipulation protocol applied to the data set is selected from among a plurality of encryption protocols in an, optionally upgradeable, library of protocols. Preferably, the selection can be driven by a random number generator. More preferably, the number of encryption protocols available can be extended using a logic-stretching engine. An apparatus is also provided for securing data, including a memory that contains data describing encryption protocols, a communications interface that is configured to receive data, and a processor that reads from the memory one of the encryption protocols and encrypts the received data based on the encryption protocol. Preferably, the apparatus also includes a random number generator, and the processor selects the encryption protocol to read, and encryption parameters to use, based on the output of the random number generator.

42 Claims, 21 Drawing Sheets

128

188

METHOD AND SYSTEM FOR SECURING DATA UTILIZING RECONFIGURABLE LOGIC

TECHNICAL FIELD OF THE DISCLOSURE

This disclosure pertains to cryptography, and, more particularly, to securing data by utilizing reconfigurable logic.

This disclosure pertains to utilizing reconfigurable logic to secure data while it is in the process of being transmitted between devices and also it pertains to securing data that is contained within a device or subsystem, such as a computing or data processing system, or computer memory or secondary or higher storage.

This disclosure pertains to utilization of reconfigurable logic to allow dynamic reconfiguration of data transmission or manipulation protocols for the purpose of increasing the security or efficiency of the overall process for which the protocol is being applied.

BACKGROUND OF THE DISCLOSURE

Encryption approaches and protocols are continually being compromised as the field of cryptanalysis, and available computing power, advances. And if cryptanalysts overcome an encryption approach, then devices which incorporate that encryption approach in fixed-logic are themselves compromised. The only way to restore security to a compromised fixed-logic device is to replace the device, the cost and inconvenience of which may be substantial.

One potential architectural approach to mitigate the inflexibility of fixed logic is to implement the protocol in software, which would then be run on some type of programmable processor. This option can, and has, been used when the protocol of interest does not have to manipulate data in a high speed manor and the programmable device can be protected such that a copy of the software implementation can not be compromised by unauthorized physical or virtual access. These very restrictive qualifying requirements remove software implemented security protocols from a large number of market segments.

By contrast, an encryption approach implemented in reconfigurable logic could be modified in response to being compromised, reestablishing security without the costs of replacing compromised fixed-logic encryption devices. Because reconfigurable logic based security algorithms operate at hardware circuit speeds, they can also be used when high processing speed, lower power draw or higher physical security requirements would exclude a software implementation.

Efforts in academic, industrial, military, and other areas to improve encryption have focused disproportionately on fixed-logic designs rather than reconfigurable-logic designs. The bias toward fixed-logic design has been influenced by, among other factors, policies and procedures of the National Security Agency (NSA). The NSA reviews encryption devices for the US government Defense and Intelligence communities and type approves those meeting certain standards. The NSA's traditional policies and procedures have been oriented towards fixed-logic designs primarily because fixed function devices are more easily verified to have no communications or processing channels through which information could be maliciously or inadvertently exposed external to the device. Since NSA type approval is required before a security device can be used by US Defense or Intelligence departments, this has heretofore effectively foreclosed type approval of encryption approaches using reconfigurable logic. Accordingly, serious encryption efforts employing reconfigurable logic for production systems have been uncommon. Likewise software based encryption systems have also heretofore had difficulty in obtaining NSA type certification for higher security purposes.

What is needed is a highly effective encryption approach for securing data which can be modified to overcome advances in cryptanalysis by virtue of being implemented with reconfigurable logic.

SUMMARY OF THE DISCLOSURE

The present disclosure teaches methods and systems for securing data utilizing protocol hopping and reconfigurable logic, alone and in combination with other cryptographic methods. One aspect of this teaching provides a method for securing data by dynamically varying the protocols applied to the data at some natural boundary in the case of block oriented data, such as data block, packet, message transition, or at an arbitrary boundary, such as some number of bits in the case of stream data. Examples of the type of protocols which can be varied include, but is not limited to, (a) encryption (b) compression and (c) data rotations, substitutions, or transformations along fixed or varying bit boundaries. The manipulation algorithm applied to the data is selected from among a plurality of such algorithms of that class. For instance, among encryption algorithms the system could apply AES to one body of data, then apply Twofish to another, then Triple DES to another, and so on. Preferably, the varying protocol selection can be driven by a random number generator (RNG). More preferably, the number of random number generator algorithms available can be extended using a "Logic-Stretching" engine, where the output stream of a single RNG can be varied by treatment with logical operators to supply a large number of potential output streams depending upon the selection of logic operators. Alternately, the above described protocol hopping security process can be implemented partially in reconfigurable logic and partially in non-reconfigurable logic.

Another aspect of this teaching provides an apparatus for securing data, including (a) a memory that contains data describing encryption algorithms, (b) a communications interface that is configured to receive data, (c) and a processor that reads from the memory one of the encryption algorithms and encrypts the received data based on the selected encryption algorithm. Preferably, the apparatus also includes a random number generator, and the processor selects the encryption algorithm to utilize based on some portion of the output of the random number generator. Alternately, the memory, random number generator, and processor are implemented partially in reconfigurable logic and partially in non-reconfigurable logic.

Other aspects, objectives and advantages of the invention will become more apparent from the remainder of the detailed description when taken in conjunction with the accompanying drawings.

BRIEF DESCRIPTION OF THE DRAWINGS

For a more complete understanding of the present disclosure, and the advantages thereof, reference is now made to the following brief descriptions taken in conjunction with the accompanying drawings, in which like reference numerals indicate like features.

DETAILED DESCRIPTION

Simply stated, the purpose of encryption is to replace the task of keeping one thing, or combination of things, secret with the task of keeping some other thing, or combination of other things, secret. Accordingly, a plaintext message is encrypted into a ciphertext message containing the same information as the corresponding plaintext, but formatted so as to be unreadable without a particular key. In other words, ciphertext is a code, and the task of keeping the plaintext message secret is replaced with the task of keeping either the plaintext message or the key secret. Of course, this assumes that the encryption is sufficiently strong to prevent being overcome by cryptanalysis.

Conventionally, it is the key rather than the plaintext that is kept secret. This makes sense because it would presumably require the same amount of effort to keep the ciphertext message secret as it would have taken to keep the plaintext message secret without bothering to encrypt it at all. Common types of keys in cryptography include message key, running key, user key, and alias key. Essentially, a key is used to establish a specific state in a particular cryptographic device. This is easily seen in an example where a component of the cryptographic device is a pseudo-random number generator. In that example, the key operates as a seed which deterministically and predictably causes the pseudo-random number generator to output a specific stream of pseudo-random numbers.

Figure 1:
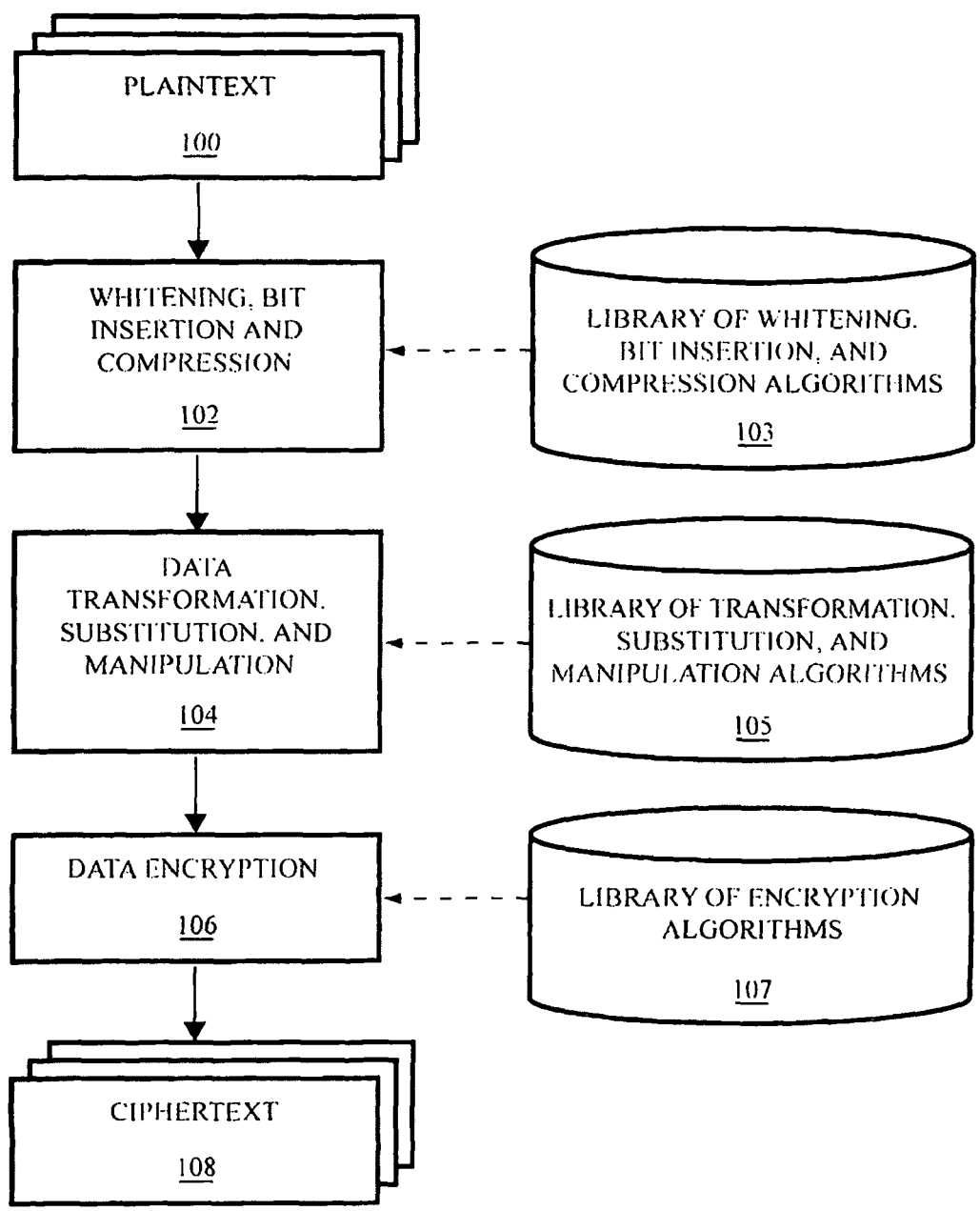
FIG. 1 is a flowchart representing an encryption method, according to an embodiment of the invention.

Turning now to the figures, FIG. 1 is a flowchart representing an encryption method, according to an embodiment of the present invention. Plaintext 100 undergoes whitening, bit insertion, and compression 102 (utilizing one or more algorithms from a library of whitening, bit insertion, and compression algorithms 103), data manipulation 104, such as transformation and substitution, (utilizing one or more algorithms from a library of data transformation, substitution, and manipulation algorithms 105) and encryption 106 (utilizing one or more algorithms from a library of encryption algorithms 107), producing ciphertext 108.

Whitening data makes the data appear to a cryptanalyst more like a random bit sequence, without a discernable pattern. Whitening therefore hinders cryptanalysis by reducing or eliminating plaintext-based pattern matching statistical analysis. A rudimentary example is the fact that the letter E appears far more frequently in normal English usage than the letter Z. If left uncorrected, the statistical patterns property of certain data such as text, or message preambles, needlessly increases the likelihood that a cryptanalysis attack will succeed.

Common whiteners include the use of digital filter scramblers, very large block sizes, multiple encryption, Cipher Block Chaining, and Linear Feedback Shift Registers. Scramblers are used to randomize data, reducing the likelihood of outputting long sequences of 1's or 0's. Likewise, employment of very large block sizes would be expected to result in whiter cipher blocks by virtue of the greater volume of plaintext contained in each block. Alternately, multiple encryption results in whiter cipher blocks because each subsequent encryption pass takes as input a cipher block output by the preceding encryption pass, which would be expected to be far whiter than typical plaintext.

Cipher Block Chaining (CBC) is a technique used in applying block ciphers. In CBC processing of data, the current data block is XORed with the preceding data block. Of course, the fact that the first block to be enciphered does not have a preceding data block is a problem that must be dealt with. Typically this is resolved by using an initial value block and treating the initial value block as the preceding block for XORing with the first block. If improperly handled, CBC's first-block problem exposes the approach to a possible man-in-the-middle attack that focuses on the initial value block. One approach to addressing this vulnerability is to utilize a keyed error-corrected code or hash, such as a message authentication code or block authentication code which will indicate if the initial value block has been modified, possibly by a man-in-the-middle. An alternate approach is to encipher the initial value block so that modification by a man-in-themiddle will result in the entire first block being garbled when unencrypted—an indication that the initial value block has been modified.

An XOR mask can be used to easily whiten a block by inverting an expected 50% of the data block's bits. Similarly, a binary invert mask can be expected to invert about 50% of the data's elements. Accordingly, an invert mask can be used to whiten data. An example of a binary invert mask is a block of 0's and 1's which is intended to be invert-combined with the data to be whitened. An invert mask operates in accord with the following table:

| Invert Mask Bit | Data Block Bit | Result |
|---|---|---|
| 0 | 0 | 0 |
| 0 | 1 | 1 |
| 1 | 0 | 1 |
| 1 | 1 | 0 |

An XOR mask and an invert mask can be chained to improve the whitening of data. In effect, combining data with an XOR mask followed by an invert mask further complicates the whitening process, thereby hindering subsequent cryptanalysis to some extent. In one embodiment taught by the present disclosure, a substitution box (S-box) is used to communicate an XOR mask and an invert mask during session initialization. Each mask is communicated using 16 bits of a 32-bit word. Each 16-bit word portion corresponds to one in a sequence of masks. In other words, each 16-bit word is a pointer into a table of masks: one table containing XOR masks and the other table containing invert masks.

An S-box can be a single substitution table or a group of substitution tables. S-boxes can be used to affect data balance, avalanche, or nonlinearity characteristics, among others. Improved balance encompasses ciphertext statistical properties wherein the number of 0's is close to the number of 1's. Avalanche is a characteristic wherein a change of a single bit causes a change in the table entry selected. The table-entry change typically causes selection of an entirely different table, which may then be combined with the data block by XOR, invert, or otherwise. As a result, a change in one bit of an input data block will potentially cause changes in a large number, preferably 50%, of bits of the entire output data block. S-boxes can be keyed or not. Substitution examples include simple substitution, homophonic substitution, polyalphabetic substitution, or polygram substitution.

One spectrum useful in understanding encryption approaches is to differentiate between block ciphers and stream ciphers—although there are encryption approaches which share characteristics of each. Block ciphers operate on groups or blocks of bits rather than on one bit at a time. Conversely, stream ciphers generally operate on characters, or bits, one-at-a-time.

Some examples of types of block ciphers include simple substitution, transposition cipher, homophonic substitution, dynamically selectable block size, and dynamically variable size block.

A valuable feature of block ciphers, at least those block ciphers having avalanche properties, is that changing a single bit in a block of plaintext has the potential to change the bits in the corresponding block of ciphertext in widespread and random-like fashion. In the binary case, this typically results in significant whitening of the resulting ciphertext as about half of the ciphertext bits change for any given change or combination of changes in the plaintext block. A similar analysis applies to any case where the character set being used has a size of two. For other-sized character sets, one would expect about 1/N of the ciphertext characters to remain unchanged following any given plaintext change, where N is the number of characters in the character set. For example, if the character set is the 26 capital letters of the English alphabet, then a change in the plaintext block, would result in a change to all but 1/26 of the ciphertext characters. In other words, 25/26 of the characters in the ciphertext block would be expected to change. This characteristic of block ciphers is called data diffusion and provides data whitening.

A basic, although not necessarily preferred, block cipher approach is to operate on the message as a single monolithic block. Depending upon available resources, this approach can prove problematic for very large messages. An approach which overcomes the problem of encrypting very large messages while retaining most of the benefit of using a block cipher approach is to partition the message into multiple smaller blocks, which are each enciphered using a block cipher. In devices using the present disclosure, the block cipher employed can be the same across all message blocks or can vary in some manner, possibly even continually changing from one block to the next. Where message blocks have a standard size, the final message block must typically be padded to reach the standard size. Varying block sizes are also possible.

Within most current block encryption protocols, the method of processing one block of input data can optionally be related to the contents of a previously processed block's output. CBC is only one available approach to breaking messages into multiple blocks for enciphering. Other well-known approaches include Electronic Codebook (ECB), Ciphertext Feedback (CFB), and Output Feedback (OFB). These varying approaches are generally referred to as "modes" of an encryption algorithm, and the present disclosure teaches that these modes can also be varied, or "hopped", to increase the degree of difficulty presented to a crypto analyst attempting to decrypt a ciphertext.

A Linear Feedback Shift Register (LFSR) is a shift register including one or more XOR feedback taps or connections. LFSRs are typically used to produce a relatively lengthy stream of binary digits or bits. For example, consider an LFSR having space for eight bits and configured so that, upon shifting, the first bit-space is filled with a bit that is the result of XORing the former contents of the last bit-space with the former contents of one of the other seven bit-spaces. If the LFSR is implemented iteratively and does not begin with every bit-space containing a zero, then the values of the bit-spaces will progress through $2^n-1$ combinations, which is only one short of the theoretical maximum number of combinations: $2^n$. The operation used to join the feedback connections is commonly XOR, but need not be.

At the other end of the spectrum from block ciphers are stream ciphers. Rather than processing data block-by-block, stream ciphers process data element-by-element. Conceptually, stream ciphering is simply block ciphering where the block size is only large enough to hold a single data element. In order to be effective, stream ciphers usually retain state information between characters. For example, a stream cipher could encrypt a plaintext stream by generating and concurrently combining a key stream with the plaintext stream on an element-by-element basis. One advantage of stream ciphers is that they do not require an entire block to be accumulated for processing to begin. Additionally, stream ciphers do not need data diffusion as do block ciphers because, unlike block ciphers, stream ciphers lack multiple data components which need protection from cryptanalysis.

Some examples of types of stream ciphers include confusion sequence, filter, monoalphabetic, polyalphabetic, dynamic, and iterative.

The exclusive-OR (XOR) function, referenced above and hereafter, is a Boolean logic function commonly used in cryptography. The XOR function operates according to the following table:

| Input 1 | Input 2 | Output |
|---------|---------|--------|
| 0 | 0 | 0 |
| 0 | 1 | 1 |
| 1 | 0 | 1 |
| 1 | 1 | 0 |

As a practical matter, the XOR function is typically constructed using various combinations of the NOT, AND, and OR logic functions. These logic functions operate according to the following tables:

| Input | NOT |
|-------|-----|
| 0 | 1 |
| 1 | 0 |

| Input 1 | Input 2 | AND | OR |
|---------|---------|-----|----|
| 0 | 0 | 0 | 0 |
| 0 | 1 | 0 | 1 |
| 1 | 0 | 0 | 1 |
| 1 | 1 | 1 | 1 |

The XOR function is a linear additive combiner, as is addition, and is therefore reversible. Another class of combiners used in cryptography includes reversible non-linear combiners which include state information and can be keyed, such as a Latin square combiner or Dynamic Substitution combiner.

Figure 2:
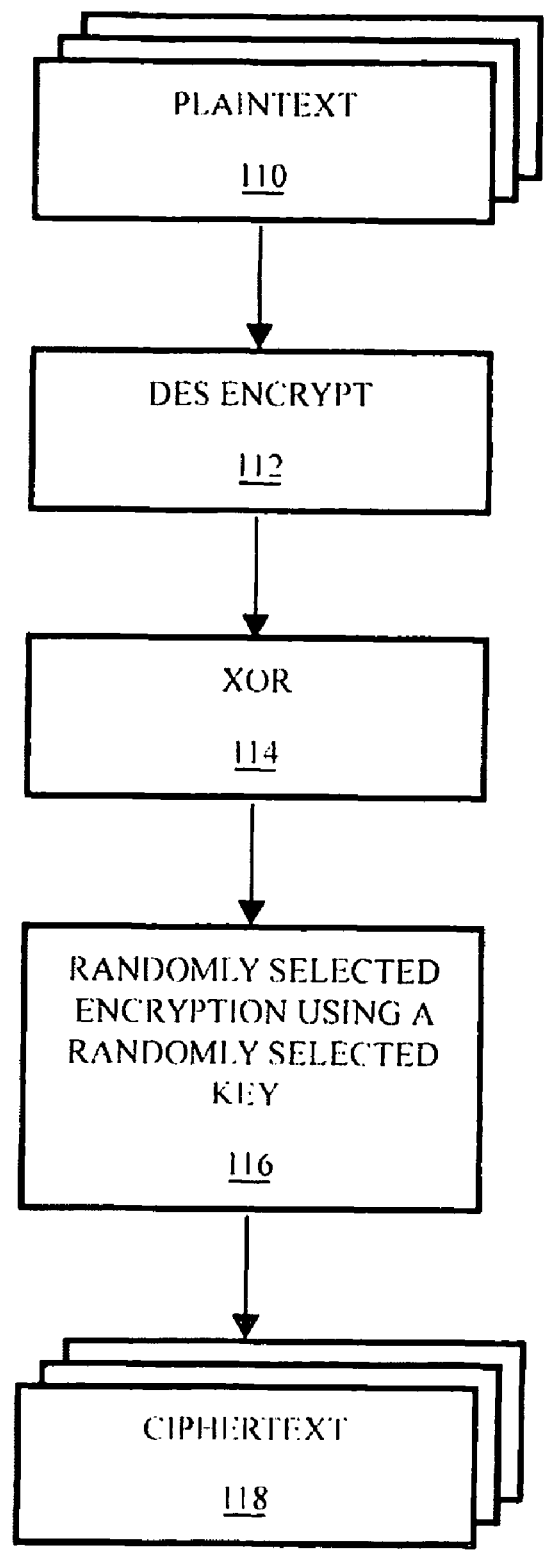
FIG. 2 is another flowchart representing an encryption method, according to an embodiment of the invention.

FIG. 2 is another flowchart representing an encryption method. Plaintext 110 undergoes Data Encryption Standard (DES) encryption 112 in order to whiten the data. The data then undergoes XORing 114 which further whitens the data. The data then undergoes encryption 116 by a randomly selected encryption algorithm using a randomly selected key, producing ciphertext 118. DES encryption is a 64-bit conventional block cipher having a 56-bit key. A more recent conventional block cipher known as the Advanced Encryption Standard (AES) has been developed to replace DES and selected by the National Institute of Standards and Technology (NIST) for U.S. Government use. AES can be implemented using 128, 192 or 256-bit keys.

Random numbers frequently play an important role in cryptography. A random number is one which is unpredictable. Typically, it is preferable not only that the number is unpredictable but that its likelihood of being any particular value is equal to its likelihood of being any other possible value. Ideally, the characteristic of unpredictability means that, at any given time, knowledge of all previous values in the number stream would be of no use in predicting the next number. Devices that produce streams of random numbers, known as random number generators, are in widespread use.

As a practical matter, real-world devices and algorithms typically employ pseudo-random number generators. Such generators typically utilize a seed or initial value to produce a stream of numbers which appear random, but are not physically or "really" random. Physically or really random numbers are nondeterministic and are produced, for example, by radioactive decay, Zener-diode shot noise, or thermal noise. In general, computers are deterministic and are therefore much more able to produce pseudo-random number streams than physically random number streams.

The Pseudo-random number streams are deterministic. That is, given the same pseudo-random number generator and the same seed or initial state, the same number stream will be produced. However, a good pseudo-random number stream may well be sufficiently unpredictable for the cryptographic task to which it is put. Furthermore, a pseudo-random number generator may, by its very design, be able to guarantee that its output number stream has desirable statistical characteristics that cannot be guaranteed by a really random number generator. One advantage of a deterministic sequence is that two parties, each in possession of an identical pseudo-random number generator and identical seeds or keys, will be able to generate identical random-appearing yet identified number streams. Post-processing can be used to improve the statistical characteristics of really random number streams, but accompanying trade-offs must often be made.

Figure 3:
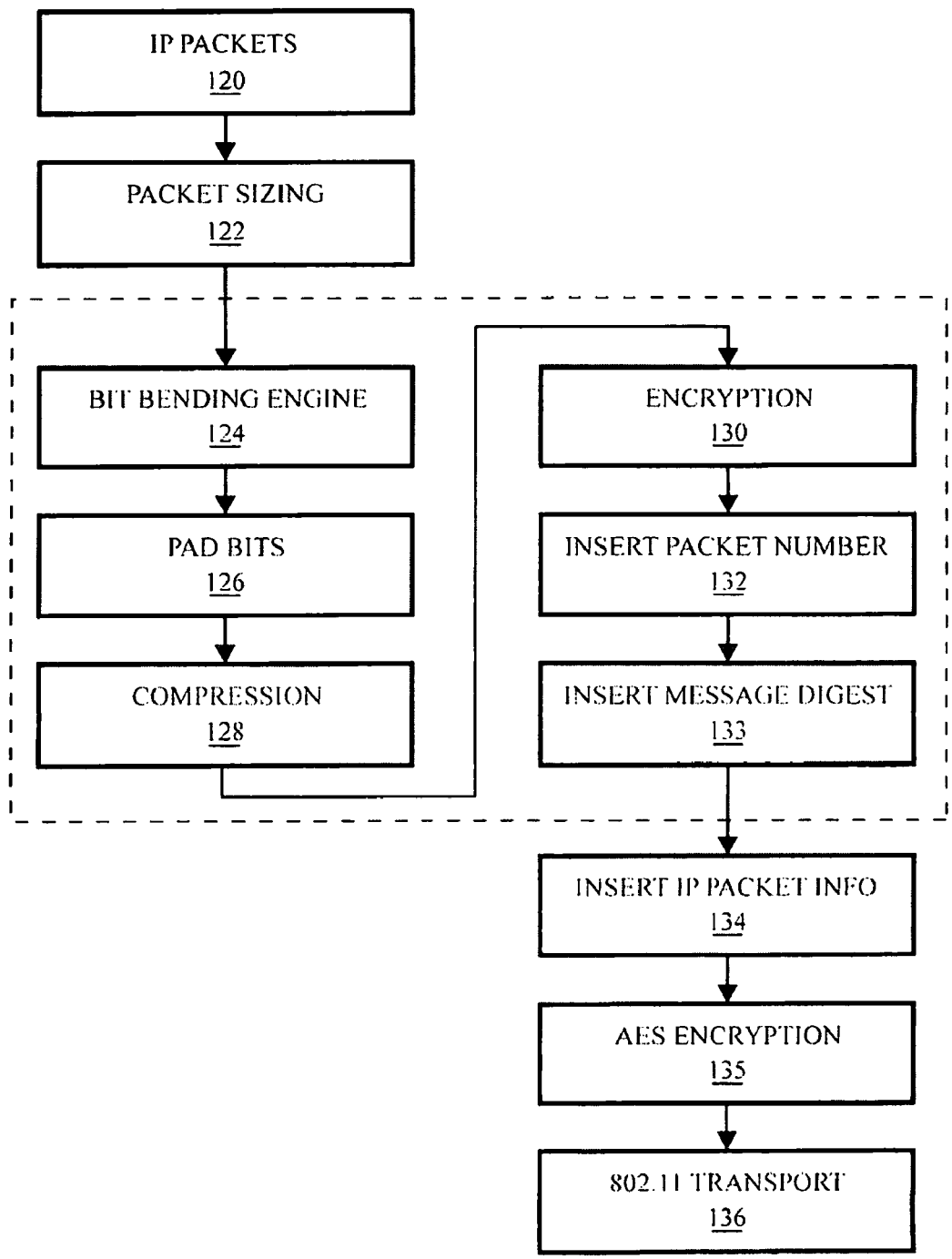
FIG. 3 is yet another flowchart representing an encryption method, according to an embodiment of the invention.

FIG. 3 is yet another flowchart representing an encryption system called Tactically Unbreakable COMSEC (TUC), which is a trademark of Advanced Communications Concepts, Inc., which applies the teachings contained in the present disclosure to the security of data while it is being transmitted. Such COMmunications SECurity is often referred to as COMSEC. While FIG. 3 depicts an overview of the TUC example, FIGS. 4-9 depict portions of the TUC example in greater detail. Turning to FIG. 3, Internet Protocol (IP) packets 120 undergo packet sizing 122. In the present embodiment, packets are sized at 2048 bits per data block. A bit bending engine 124 manipulates the data block. Pad bits are added 126 to the data block. The data block undergoes compression 128, then encryption 130. Packet numbers are inserted 132 into the data block. A message digest is also inserted 133 into the data block. IP packet information is inserted 134 into the data block. The data block undergoes AES encryption 135. Finally, the data block is formatted for 802.11 transport 136.

Compressing data can not only reduce the size of plaintext prior to enciphering, but also helps remove recurring patterns in the plaintext. Both results potentially improve post-enciphering cryptographic strength, the former by changing the apparent message length and the latter by obscuring patterns in the plaintext. The former benefit can also be obtained where ciphertext is compressed after encryption rather than before. Message length can also be changed by adding pad elements or bits to a message block. The pad elements may be fixed, varying, or even pseudo-random in position or number.

Figure 4:
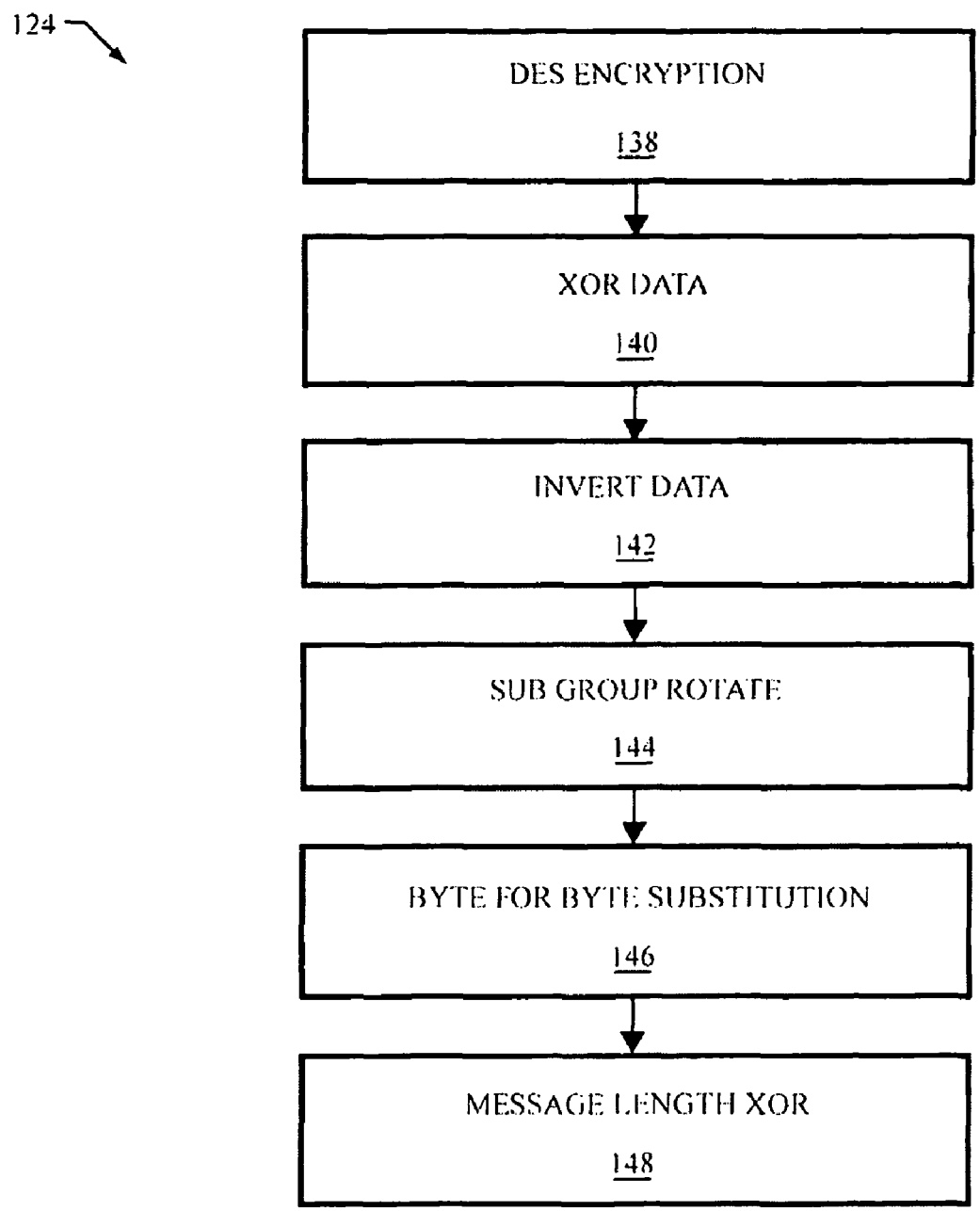
FIG. 4 is a flowchart representing a bit bending portion of the encryption method represented in FIG. 3, according to an embodiment of the invention.

FIG. 4 is a flowchart representing a bit bending portion 124 of the encryption method represented in FIG. 3. The data block undergoes DES encryption 138. The DES encryption provides bit whitening and requires 56 random bits for it's key. The data block is XORed 140, using two 32-bit numbers obtained from S-Boxes at session initialization. The data block is inverted 142, per the pattern of an "invert mask" of pseudo-random bits. Subgroups of the data block are rotated 144, rotating bytes based on up to 1024 random bits. Four bits per byte of message length are used. The first bit indicates the direction: left or right. The second, third, and fourth bits indicate rotate length. The data block undergoes byte-forbyte substitution 146 using a 256-byte table. The data block then undergoes a message-length XOR 148, requiring up to 2048 bits for XOR mask selection or creation.

Figure 5:
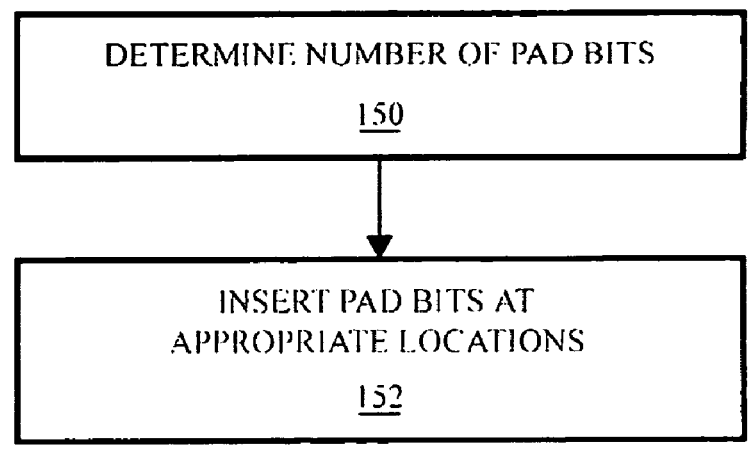
FIG. 5 is a flowchart representing a pad bits portion of the encryption method represented in FIG. 3, according to an embodiment of the invention.

FIG. 5 is a flowchart representing a insert bits portion 126 of the encryption method represented in FIG. 3. The number of insert bits is determined 150 by taking 5 bits of output from a random number generator and adding 32. The next 14 bits are for the address at which to add the pad bit and one bit is used to pad, so the maximum number of bits used is 8+(64*15)=965. Accordingly, pad bits are inserted 152 at appropriate locations in the data block.

Figure 6:
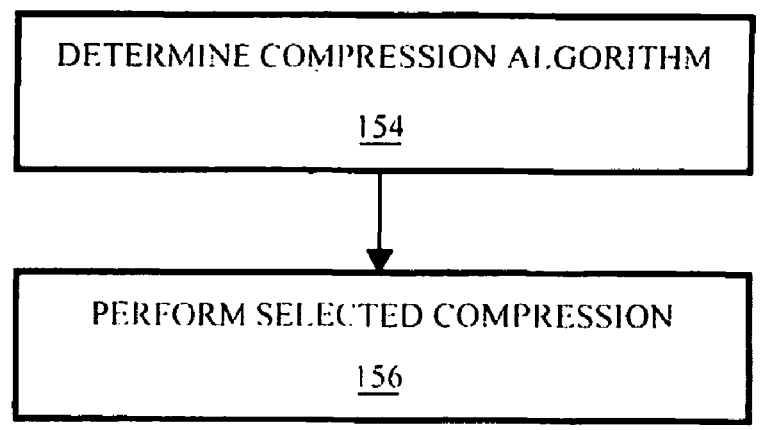
FIG. 6 is a flowchart representing a compression portion of the encryption method represented in FIG. 3, according to an embodiment of the invention.

FIG. 6 is a flowchart representing a compression portion 128 of the encryption method represented in FIG. 3. A compression algorithm is determined 154 by taking 16 bits of output from a random number generator to select the compression algorithm for use. Additionally, two banks of 32-bit numbers provide the ability to mask data. As a result, determination of the compression algorithm requires the use of 80 random bits. The data block undergoes 156 the selected compression.

Figure 7:
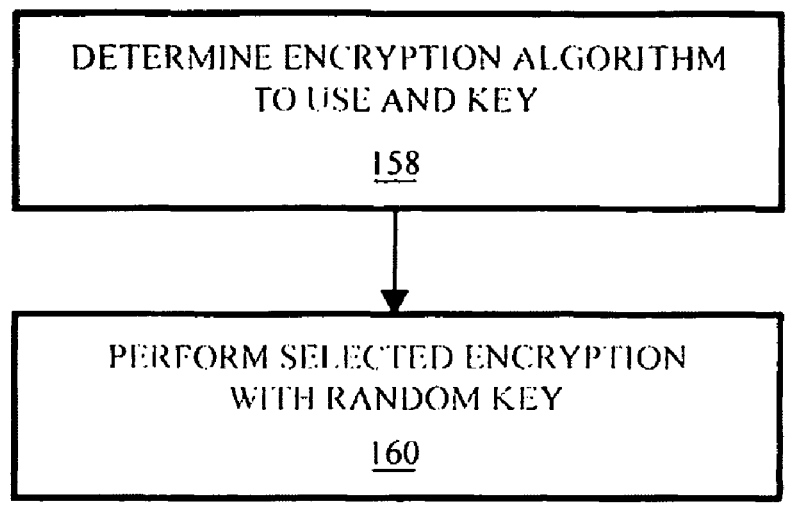
FIG. 7 is a flowchart representing an encryption portion of the encryption method represented in FIG. 3, according to an embodiment of the invention.

FIG. 7 is a flowchart representing an encryption portion 130 of the encryption method represented in FIG. 3. An encryption algorithm is selected 158 by taking 16 bits of output from a random number generator. Two banks of 32-bit words are also used for additional masks. Then up to 2048 random bits form the encryption key. The data block undergoes the selected encryption using the randomly generated key 160.

Figure 8:
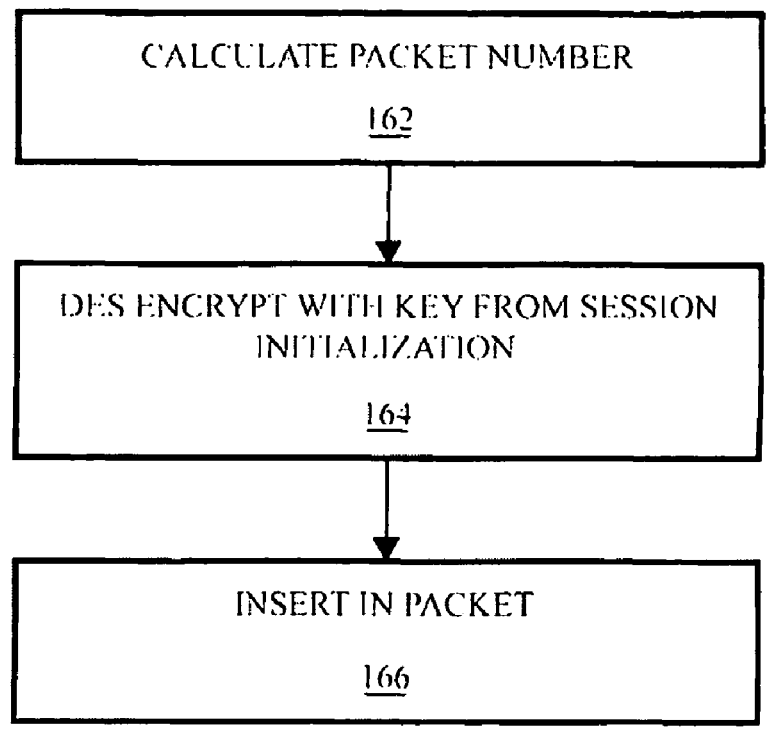
FIG. 8 is a flowchart representing a packet number insertion portion of the encryption method represented in FIG. 3, according to an embodiment of the invention.

FIG. 8 is a flowchart representing a packet number insertion portion 132 of the encryption method represented in FIG. 3. A 64-bit packet number is calculated 162. The packet number is encrypted with, in this example, DES encryption using the session-initialization defined key 164. The encrypted packet number is inserted 166 into the packet at an insertion position determined during session initialization.

Session initialization can be performed by the confidential exchange of a secret key out-of-band or a pair of public keys, either in-or out-of-band. In the latter case, a public key infrastructure is relied upon for authentication services to combat the potential for a man-in-the-middle attack. Authentication in this case means that public keys can and should be certified for a public-key encryption system to work properly.

Figure 9:
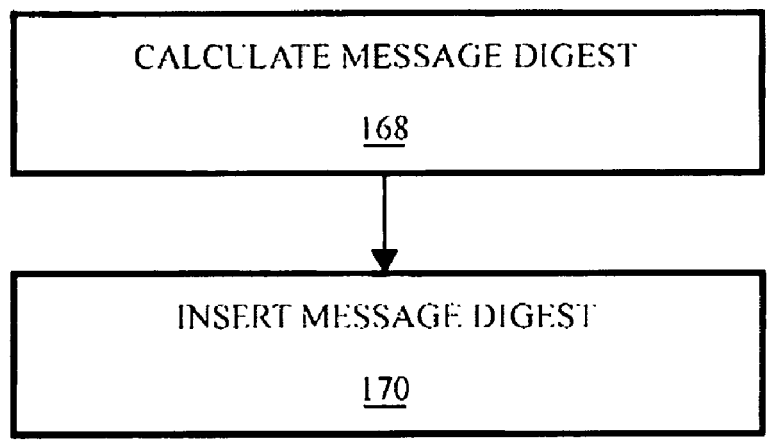
FIG. 9 is a flowchart representing a message digest insertion portion of the encryption method represented in FIG. 3, according to an embodiment of the invention.

FIG. 9 is a flowchart representing a message digest insertion portion 134 of the encryption method represented in FIG. 3. A message digest is calculated 168 using SHA1, SHA2, or MD5 based on packet size. The message digest is inserted 170 at a location determined during session initialization. Hash functions are primitives used in a variety of cryptographic constructions. Hash functions are designed to be "one-way" and "collision resistant". A hash function is one-way if it is hard to find the input string x corresponding to the output string h(x). Hash collision occurs when h(x)=h(y) for distinct strings 'x' and 'y'. A meaningful hash collision compromises security.

MD5 and SHA1 are two popular hash-function algorithms that take an arbitrary input string and generate a "fingerprint," which is intended to be unique. If a hash function is secure, changing a character of the input string results in a different fingerprint. Security applications can then certify, for example, that a software component is safe to execute based on it bearing a known and trusted fingerprint. If the fingerprint is not unique, then potential exists for an attacker to employ a second-pre-image attack, substituting a false fingerprint on malicious code so that the malicious code appears to be safe based on a review of the fingerprint. SHA2 is an improved version of SHA1.

Figure 10:
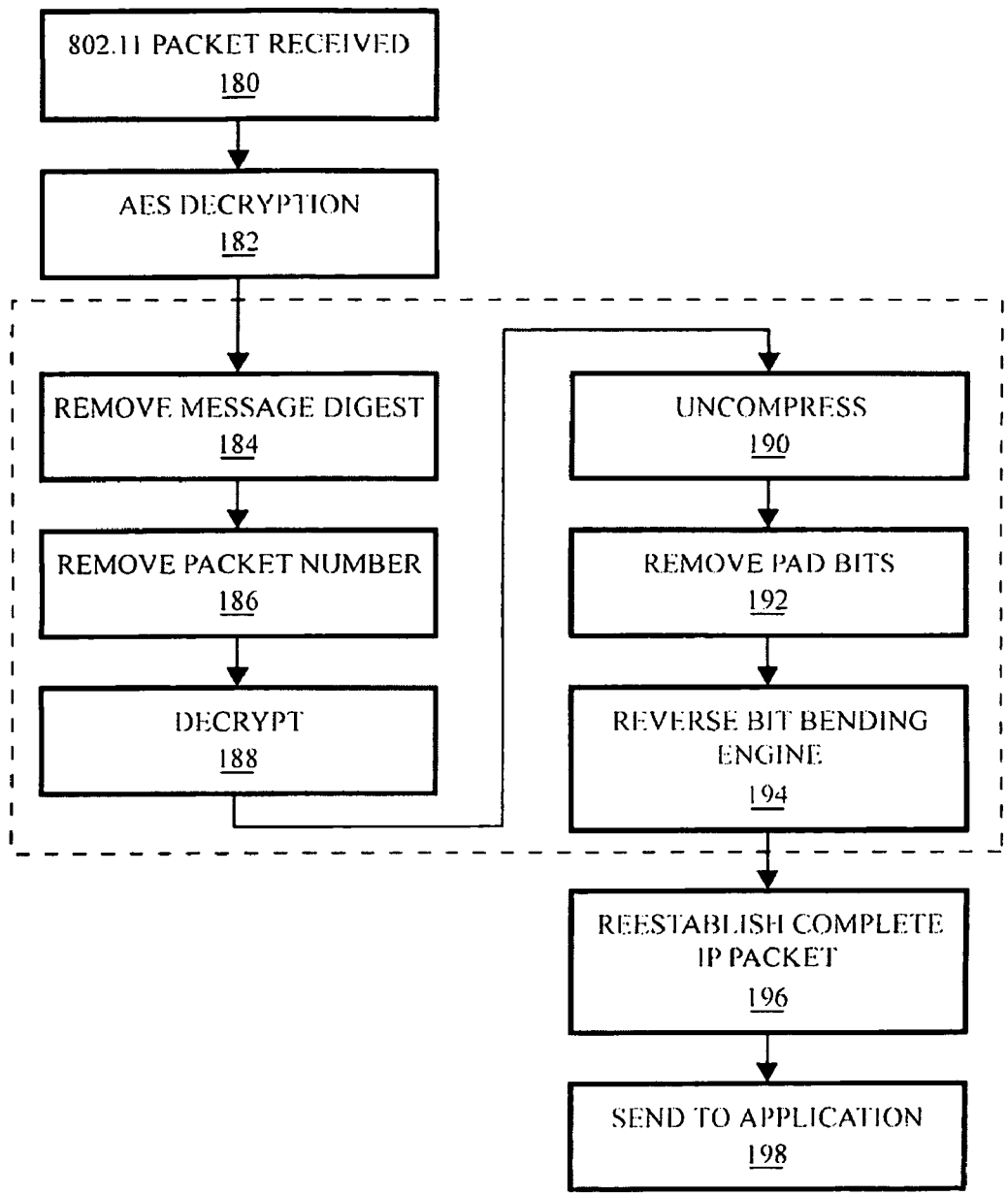
FIG. 10 is a flowchart representing a decryption method, according to an embodiment of the invention.

FIG. 10 is a flowchart representing a decryption method. An 802.11 packet is received 180. The packet undergoes AES decryption 182. The packet's message digest 184 and number 186 are removed. The packet is decrypted 188 and uncompressed 190. Pad bits are removed 192 from the packet, and a reverse bit-bending engine then operates on the packet 194. The complete IP packet is then reestablished 196 and sent to an application 198.

Figure 11:
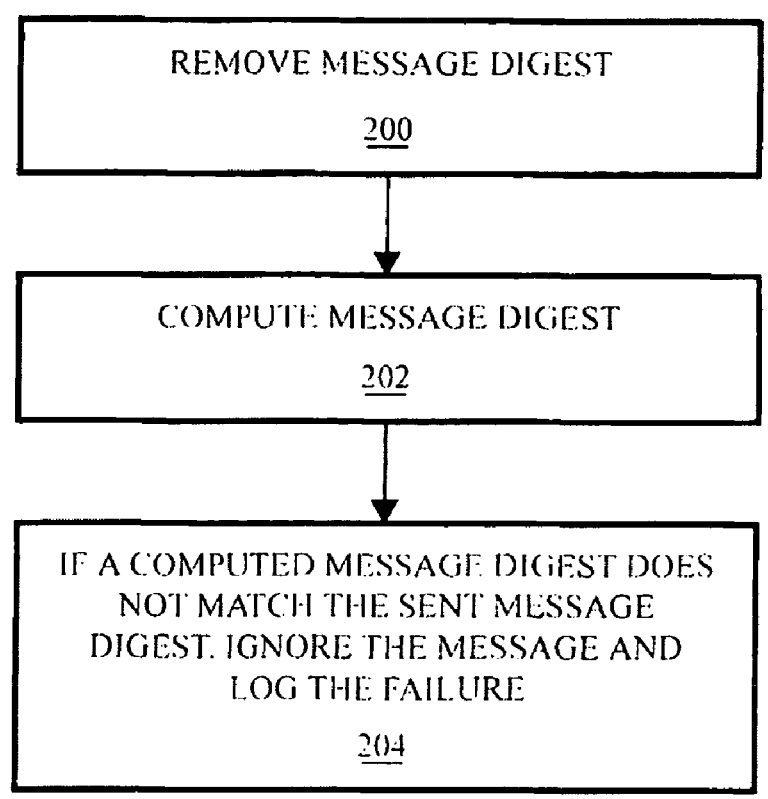
FIG. 11 is a flowchart representing a message digest removal portion of the decryption method represented in FIG. 10, according to an embodiment of the invention.

FIG. 11 is a flowchart representing a message digest removal portion 184 of the decryption method represented in FIG. 10. The message digest is removed 200. The message digest location within the packet is determined during session initialization. SHA1, SHA2, or MDA5 is used depending on the packet length. The message digest is computed 202. If a computed message digest does not match the sent message digest, the message is ignored and failure logged 204.

Figure 12:
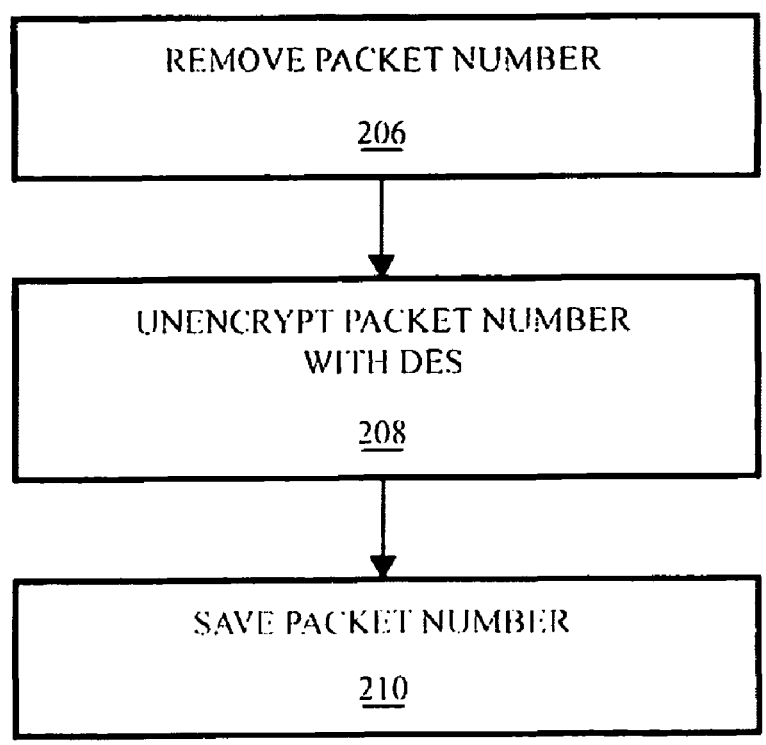
FIG. 12 is a flowchart representing a packet number removal portion of the decryption method represented in FIG. 10, according to an embodiment of the invention.

FIG. 12 is a flowchart representing a packet number removal portion 186 of the decryption method represented in FIG. 10. The packet number is removed 206 from the packet. The packet number is a 64-bit number at a location determined at session initialization. The packet number is unencrypted 208 using DES with a key obtained during session initialization. The packet number is saved 210 and used as a pointer to a random number string for subsequent operations.

Figure 13:
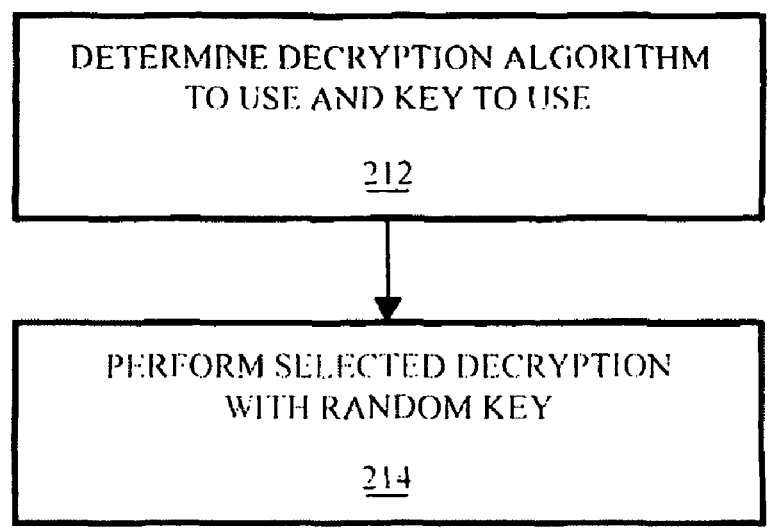
FIG. 13 is a flowchart representing a decryption portion of the decryption method represented in FIG. 10, according to an embodiment of the invention.

FIG. 13 is a flowchart representing a decryption portion 188 of the decryption method represented in FIG. 10. The decryption algorithm and key are determined 212 by taking 16 random bits to select the decryption algorithm corresponding to the earlier-selected encryption algorithm and two banks of 32-bit words are used for additional masks. Then up to 2048 random bits are used for the decryption key. The packet is then decrypted 214 using the selected decryption algorithm with the selected key.

Figure 14:
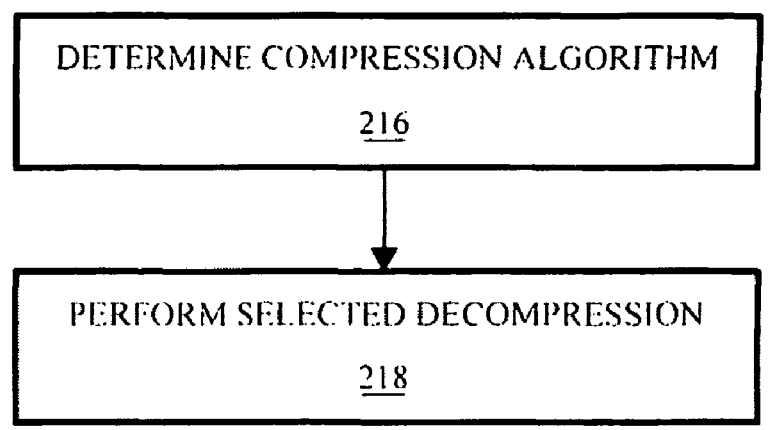
FIG. 14 is a flowchart representing an uncompress portion of the decryption method represented in FIG. 10, according to an embodiment of the invention.

FIG. 14 is a flowchart representing an uncompress portion 190 of the decryption method represented in FIG. 10. A compression algorithm is selected 216 based on 16 bits of output from a random number generator. Two banks of 32-bit numbers provide ability to mask data. In sum, 80 random bits are utilized in identifying the compression algorithm. The selected compression algorithm is then used to decompress 218 the packet.

Figure 15:
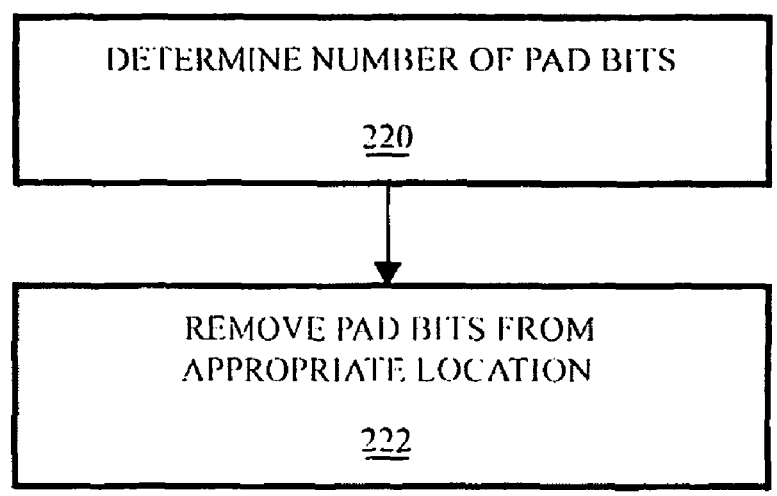
FIG. 15 is a flowchart representing a pad bit removal portion of the decryption method represented in FIG. 10, according to an embodiment of the invention.
Figure 16:
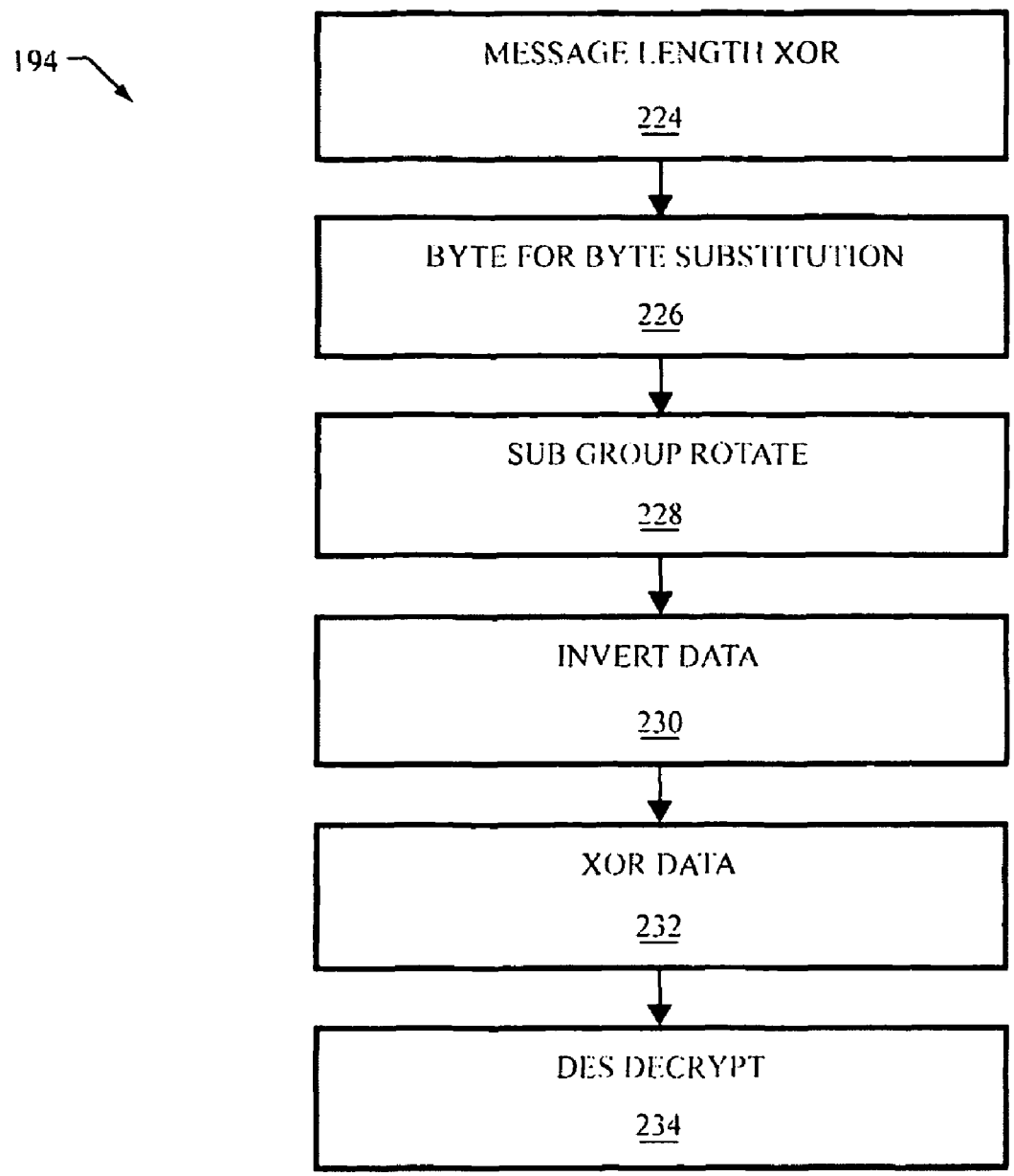
FIG. 16 is a flowchart representing a bit bending reversal portion of the decryption method represented in FIG. 10, according to an embodiment of the invention.

FIG. 15 is a flowchart representing a pad bit removal portion 192 of the decryption method represented in FIG. 10. The number of pad bits is determined 220 by taking 8 bits of output from a random number generator, adding 32 to the byte taken. The next 12 bits are used for the address to add the pad bit and one bit is used as the pad. Accordingly, the maximum number of bits used is 8+(64*15)=965. Pad bits are removed 222 from appropriate locations FIG. 16 is a flowchart representing a bit bending reversal portion 194 of the decryption method represented in FIG. 10. XOR is performed 224 on the message length, requiring up to 2048 bits. XORing is followed by byte-for-byte substitution 226 using a 256-byte reverse lookup table. A subgroup rotate is performed on the message 228 based on up to 1024 random bits. Message data is inverted 230, requiring up to 2048 random bits. The message data is then XORed 232, using two 32-bit numbers, repeated across the entire message. The message then undergoes DES decryption 234, requiring 56 random bits.

Figure 17:
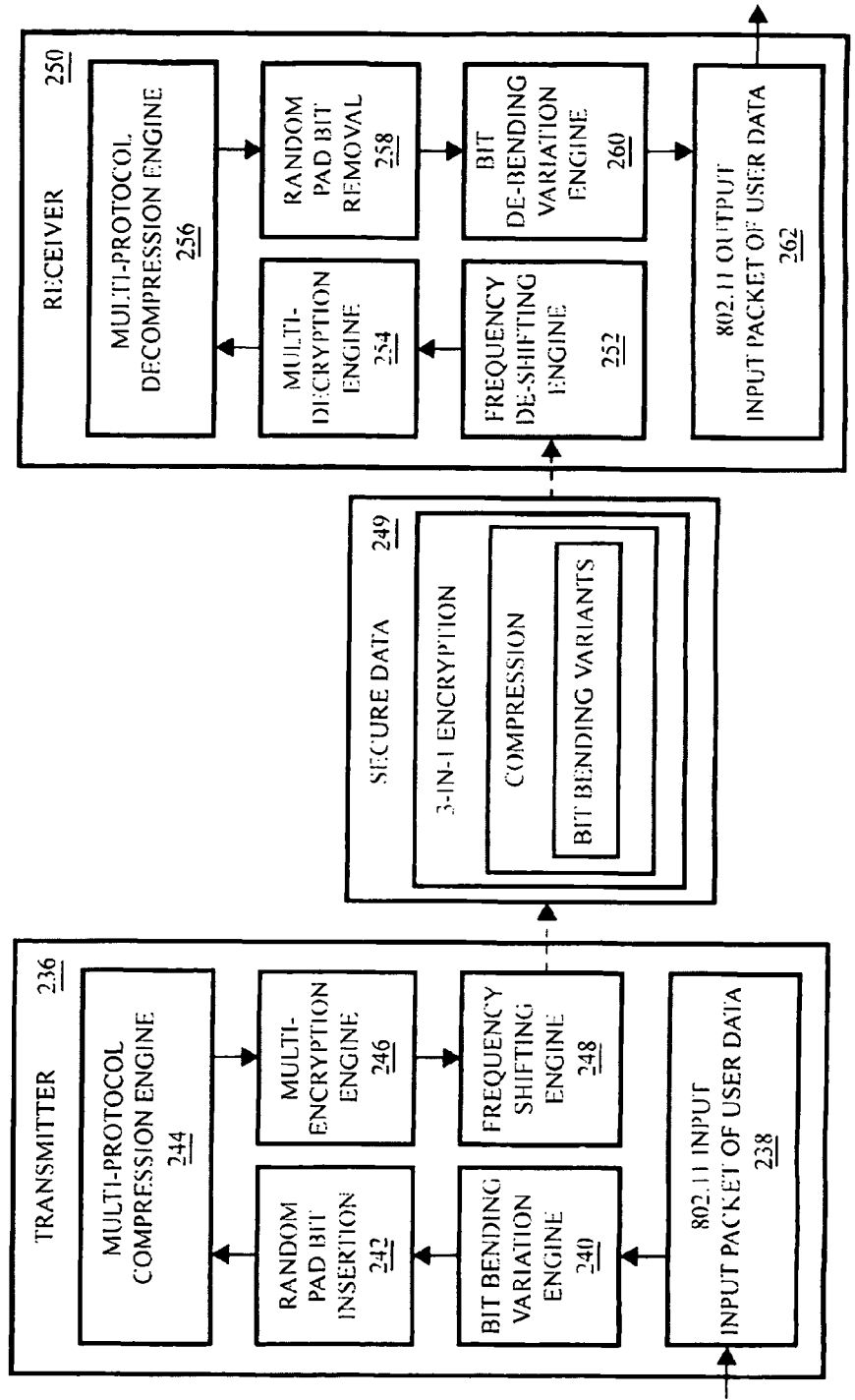
FIG. 17 is still another flowchart representing an encryption method, according to an embodiment of the invention.

FIG. 17 is still another flowchart representing an encryption method. This encryption method is also an example of Tactically Unbreakable COMSEC (TUC), which is a trademark of Advanced Communications Concepts, Inc.

FIG. 17 illustrates an example flow of a TUC data manipulation process. Essentially, a protocol's input bit stream is scrambled by a TUC-enabled transmitter 236 for transmission. Upon receipt of a TUC-scrambled transmission, a TUC-enabled receiver 250 unscrambles the message, recreating the original data stream. In this example, the data stream comprises 802.11 input packets of user data 238. The transmitter 236 operates on the data packet 238 using a bit bending variation engine 240, random pad bit insertion 242, multi-protocol compression engine 244, multi-encryption engine 246, and frequency shifting engine 248. The transmitter 236 then outputs and transmits the secured data 249 to the receiver 250. The secured data 249 benefits from multi-layered security measures, including 3-in-1 encryption, compression, and bit-bending variants. Upon receiving the secured data 249, the receiver 250 operates on the secured data 249 using a frequency de-shifting engine 252, multi-decryption engine 254, multi-protocol decompression engine 256, random pad bit removal 258, and bit de-bending variation engine 260, producing 802.11 output packet of user data 262 identical to the 802.11 input packet of user data 238.

Figure 18:
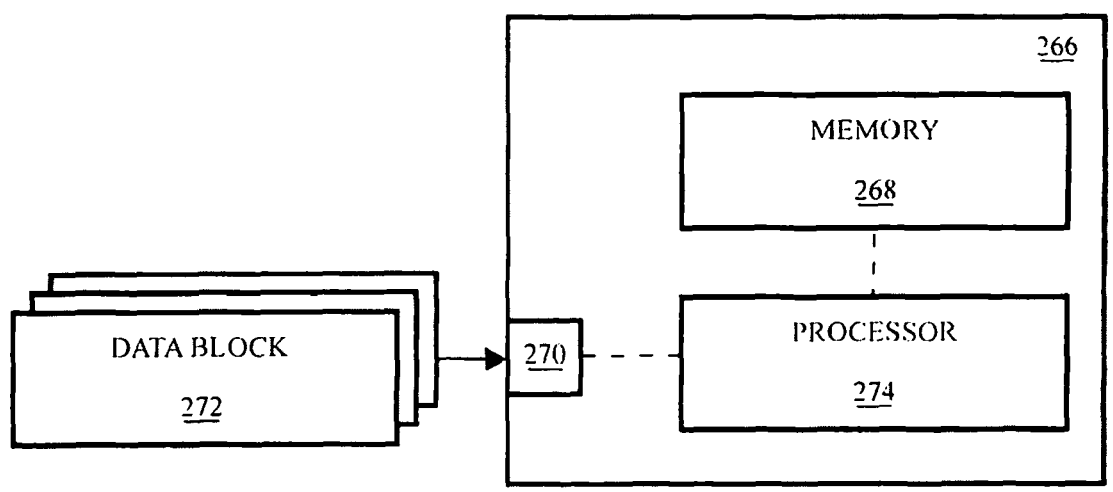
FIG. 18 is a block diagram representing an encryption device, according to an embodiment of the invention.

FIG. 18 is a block diagram representing an encryption device 266 for securing data. The encryption device 266 includes a memory 268 that contains data describing encryption algorithms and a communications interface 270 that is configured to receive data 272. The device 266 also includes a processor 274 that reads from the memory 268 one of the encryption algorithms and encrypts the received data 272 based on the encryption algorithm. The memory 268, processor 274, or both are at least partially implemented in reconfigurable logic.

In the context of this document, "reconfigurable logic" shall be defined as any logic device which can be configured by an external information stream so that its hardware circuitry operation changes in response to such external direction. Such logic device could be implemented to operate on any physical property or combination of properties, such as electronic, photonic, thermal, electromagnetic wave propagation, materials' quantum or mechanical characteristics, whether implemented by macro, micro or nano scale processes.

In the context of this document "dynamic reconfiguration" shall include any process by which the contents of a reconfigurable logic device changes in response to outside direction, or the nature of its input data, during the operational cycle of the device. This is contrasted with the current norm in the use of reconfigurable logic in which the device is programmed at power up, or device restart, and then executes its initially loaded logic until the next occurrence of a device restart or power cycle. Such dynamic reconfiguration can include all or a portion of the reconfigurable logic device's circuitry.

Examples of current reconfigurable logic families include, but are not limited to, programmable logic device (PLD), complex programmable logic device (CPLD), field programmable gate array (FPGA), some hardware implementations of neural nets and fuzzy logic, and several optical and nanotechnology based devices.

PLDs each include a plurality of fully connected macrocells, each of which typically contains a small Boolean logic function. By comparison, CPLDs each typically consist essentially of a plurality of PLDs connected together with, for example, a switch matrix. The relatively inflexible switch-matrix interconnectivity causes signal delay to be relatively predictable. As a result, CPLDs are typically selected for use in applications that require high-performance logic.

FPGAs are specially made digital semiconductor devices often used for prototyping and to accommodate "time-to-market" product designs. The integrated-circuit fabrication technology creates pre-fabricated circuit modules that are electrically configurable by the user to meet specific design requirements on a chip-by-chip basis. Users are able to program electrical FPGA connections to adapt the chip to a specific application, thereby avoiding the need to create a non-configurable chip, such as an application-specific integrated circuit (ASIC). ASICs and other non-configurable chips must ordinarily be produced in very large quantities to make production economically feasible.

Although described with particular reference to a method and system for securing data utilizing FPGA based reconfigurable logic, the claimed subject matter can be implemented in any information technology (IT) or communications system in which securing data utilizing any class of reconfigurable logic is desirable. Those with skill in the pertinent arts will recognize that the disclosed embodiments have relevance to a wide variety of computing and communications environments in addition to those described in this disclosure. In addition, unless otherwise specified or clearly apparent by context, the methods of the disclosed invention can be implemented in software, hardware, or a combination of software and hardware. For example, the hardware portion can be implemented using specialized logic; by way of further example, the software portion can be stored in a memory and executed by a suitable instruction execution system such as a microprocessor, personal computer (PC), or mainframe.

In the context of this document, a "computer-readable medium" can be any means that contains, stores, communicates, propagates, or transports a program and/or data for use by or in conjunction with an instruction execution system, apparatus, or device. In the context of this document, a "memory" is a type of computer-readable medium, and can be, but is not limited to, an electronic, magnetic, optical, electromagnetic, infrared, or semiconductor system, apparatus, or device. Memory also includes, but is not limited to, for example, the following: a portable computer diskette, a random access memory (RAM), a read-only memory (ROM), an erasable programmable read-only memory (EPROM or flash memory), and a portable compact disk read-only memory. In the context of this document, a "signal" is a type of computer-readable medium, and can be, but is not limited to, an electrical, optical, or acoustical signal, signals embodied in a carrier wave or directly transmitted, or any other manufactured transient phenomenon in which a program and/or data can be encoded.

Figure 19:
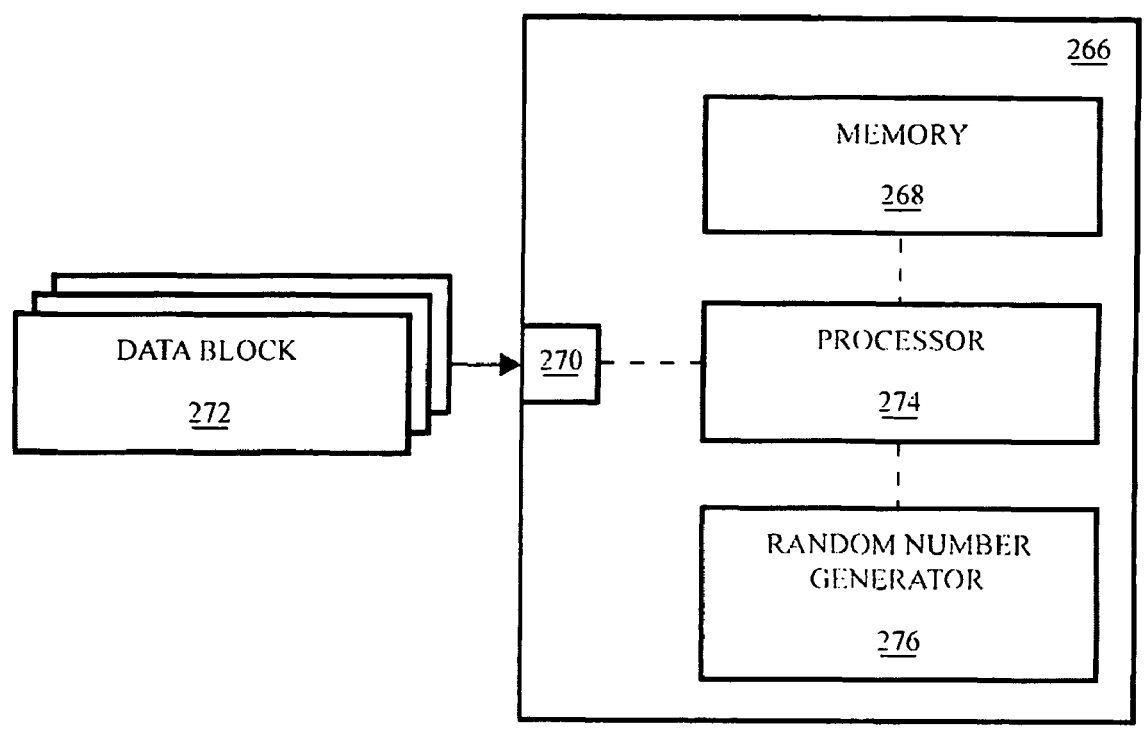
FIG. 19 is another block diagram representing an encryption device, according to an embodiment of the invention.

FIG. 19 is a block diagram that represents a variation of the encryption device 266. This variation of the encryption device 266 includes a random number generator 276. The processor 274 selects the encryption algorithm to read from the memory 268 based on the output of the random number generator 276.

Figure 20:
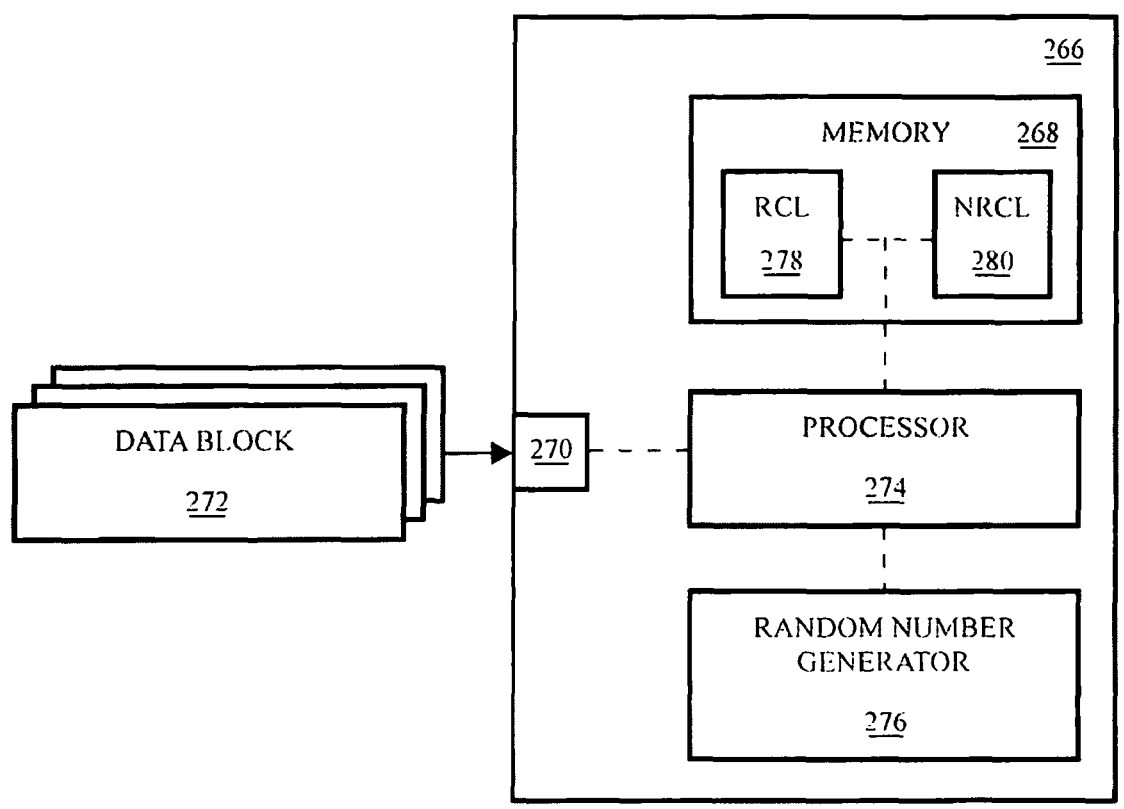
FIG. 20 is yet another block diagram representing an encryption device, according to an embodiment of the invention.

FIG. 20 is a block diagram that represents another variation of the encryption device 266. In this variation of the encryption device 266, the memory 268 is implemented partially in reconfigurable logic (RCL) 278 and partially in non-reconfigurable logic (NRCL) 280. In other variations, other portions or combinations of portions of the device 266 are implemented in non-reconfigurable logic (NRCL).

Figure 21:
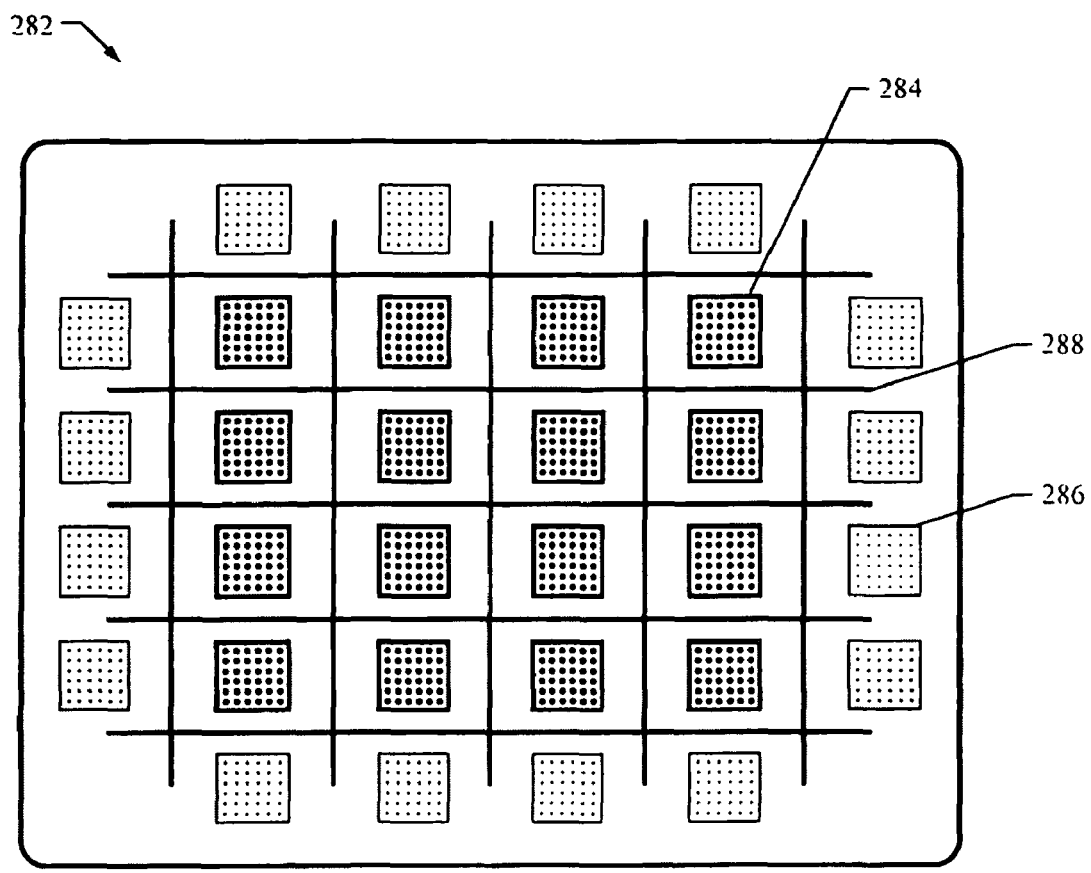
FIG. 21 is a block diagram of a field programmable gate array (FPGA), according to an embodiment of the invention.

FIG. 21 is a block diagram of an FPGA 282. The FPGA 282 includes a plurality of logic blocks 284. I/O blocks 286 regulate signal inputs to and outputs from the FPGA, while programmable interconnects 288 define the functional relationships between the logic blocks.

Compatibility of encryption devices is a major issue. One approach to achieving compatibility has been to equip communicants with identical encrypted-communications devices for the encryption and decryption of messages. Unfortunately, this approach is often infeasible.

For example, where newer encryption-communications devices must communicate with older encryption-communications devices, the newer devices must be legacy-compatible with the older devices. Likewise, communicants belonging to different groups within a single organization may require different encryption-communication devices which must be encrypted-communications compatible. For example, it might be the case that one group needs the particular features of one device, such as longer battery life, while the other group needs the particular features of the other device, such as brighter display capabilities.

As another example, communicants belonging to different organizations and having different encryption-communications devices can require, temporarily or permanently, encryption-communications compatibility. For example, communicants of a United Kingdom organization could need encryption-communications compatibility with a United States organization in order to carry out a joint project.

Forward compatibility of encryption-communications devices can also add substantially to the value of such devices under myriad circumstances due to the expectancy of longer useful device life.

Each of these compatibility issues can be resolved by utilizing reconfigurable logic in encrypted-communication devices to enable the convenient and inexpensive importation of old, different, or new encryption protocols. Such protocols would be selected and imported based on the protocols necessary to enable encrypted-communications compatibility between the devices. It is sufficient for one of the devices to utilize reconfigurable logic as that would enable the reconfigurable device to be made compatible with the other device.

In one embodiment, a first device includes reconfigurable logic and is adapted to process data based on the reconfigurable logic and communicate with the second device. One or more encryption protocols necessary for encrypted-communications compatibility with the second device is stored in the reconfigurable logic of the first device. As a result, encrypted-communications compatibility of the first device with the second device is achieved. For convenience, a set of such encryption protocols, necessary to achieve compatibility with the second device, could be bundled together as one or more libraries of encryption protocols.

All references, including publications, patent applications, and patents, cited herein are hereby incorporated by reference to the same extent as if each reference were individually and specifically indicated to be incorporated by reference and were set forth in its entirety herein.

The term "encryption protocols," as used herein, includes encryption algorithms, compression algorithms, whitening algorithms, data manipulation algorithms, and modes. A mode is a process wrapped around what an encryption or other engine does. For example, a mode could control what key is passed to an encryption engine. A mode could also or alternately control which portion of the available data is passed to an encryption engine. Similarly, a mode can determine what portion, if any, of data output from an engine is utilized further and in what manner.

The use of the terms "a" and "an" and "the" and similar referents in the context of describing embodiments of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention with current commercially available technology. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. For example, multiple coordinated processors can be substituted to perform the task assigned herein to a single processor. As another example, where one or more steps in a process is described herein, multiple rounds of the step or combination of steps can be performed. As yet another example, where a process or device refers to an "encryption protocol" or the like, it is contemplated that other protocols that tend to change the character or format of data could be used as "encryption protocols" even though known in the industry under other terminology; for example, compression protocols or parameter variation protocols could be included within the scope of the term "encryption protocol," as used hereunder. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An article of manufacture for securing data based on protocol hopping and utilizing reconfigurable logic, comprising:
   a computer-readable storage medium, adapted to reconfigurably store logic;
   a plurality of encryption protocols stored on the medium;
   logic, reconfigurably stored on the medium, for:
   selecting an encryption protocol from the plurality of encryption protocols based on the output of a pseudo random number generator, the selecting being dynamically varied to one of the plurality of encryption protocols in response to a type of data input to the reconfigurable logic;
   encrypting the data based on the selected encryption protocol; and
   repeating the selecting and encrypting steps to encrypt a plurality of data.

2. The article of claim 1, wherein the medium is a memory.

3. The article of claim 1, wherein each of the plurality of encryption protocols is selected from the group consisting of encryption algorithms, compression algorithms, whitening algorithms, data manipulation algorithms, and modes.

4. The article of claim 1, wherein each of the plurality of encryption protocols comprises an encryption algorithm.

5. The article of claim 1, wherein each of the plurality of encryption protocols comprises a compression algorithm.

6. The article of claim 1, wherein each of the plurality of encryption protocols comprises a whitening algorithm.

7. The article of claim 1, wherein each of the plurality of encryption protocols comprises a data manipulation algorithm.

8. The article of claim 1, wherein each of the plurality of encryption protocols comprises a mode.

9. An article of manufacture for securing data based on protocol hopping and utilizing reconfigurable logic driven by a random number generator, comprising:
a computer-readable storage medium, adapted to reconfigurably store logic;
logic, reconfigurably stored on the medium, for:
selecting an encryption protocol based on the output of a pseudo random number generator, the selecting to one of the plurality of encryption protocols being dynamically varied in response to a type of data input to the reconfigurable logic, with the pseudo random number generator being deterministic;
encrypting the data based on the encryption protocol;
repeating the selecting and encrypting steps to encrypt a plurality of data.

10. The article of claim 9, wherein the medium is a memory.

11. The article of claim 9, wherein the random number generator comprises a pseudo random number generator.

12. An article of manufacture for securing data based on protocol hopping and utilizing reconfigurable logic driven by a random number generator and protocols made available through a stream extension engine, comprising:
a computer-readable storage medium, adapted to reconfigurably store logic;
logic, reconfigurably stored on the medium, for:
making available a plurality of encryption protocols mutually differing based on one or more characteristics selected from the group consisting of encryption algorithms, compression algorithms, and algorithmic parameters;
selecting one of the plurality of encryption protocols based on a first output of a first pseudo random number generator, the selecting to one of the plurality of encryption protocols being dynamically varied in response to a type of data input to the reconfigurable logic, with the first output of the first pseudo random number generator being deterministic such that given a same initial state of the first pseudo random number, an additional pseudo random number generator generates an additional output identical to the first output;
encrypting data based on the selected encryption protocol; and
repeating the selecting and encrypting steps to encrypt a plurality of data.

13. The article of claim 12, wherein the medium is a memory.

14. The article of claim 12, wherein the random number generator comprises a pseudo random number generator.

15. An article of manufacture for securing data based on protocol hopping and utilizing reconfigurable and non-reconfigurable logic driven by a random number generator and protocols made available through a stream extension engine, comprising:
a computer-readable storage medium, adapted to store logic;
logic, including one portion reconfigurably stored on the medium and another portion non-reconfigurably stored on the medium and operably connected to the one portion, for:
making available a plurality of encryption protocols mutually differing based on one or more characteristics selected from the group consisting of encryption algorithms, compression algorithms, and algorithmic parameters;
selecting one of the plurality of encryption protocols based on a first output of a first pseudo random number generator, the selecting being dynamically varied in response to a type of data input to the reconfigurable logic, with the first output of the first pseudo random number generator being deterministic such that given a same initial state of the first pseudo random number, an additional pseudo random number generator generates an additional output identical to the first output;
encrypting data based on the randomly selected encryption protocol; and
dynamically repeating the selecting and encrypting steps to encrypt a plurality of data.

16. The article of claim 15, wherein the medium is a memory.

17. The article of claim 15, wherein the random number generator comprises a pseudo random number generator.

18. An apparatus for securing data based on protocol hopping and utilizing reconfigurable logic, comprising:
a memory containing data describing a plurality of encryption algorithms therein;
a communications interface configured to receive data;
a processor adapted to read from the memory one of the plurality of encryption algorithms and configured to encrypt the received data block based on the encryption algorithm read from the memory and selected by the memory;
wherein at least a portion of the logic defining the memory and the processor is reconfigurable; and
wherein the selection of the encryption protocol is dynamically varied in response to a type of data input to the logic, the selection of the encryption protocol being based on a deterministic output of a pseudo random number generator.

19. An apparatus for securing data based on protocol hopping and utilizing reconfigurable logic driven by a random number generator, comprising:
a memory containing data describing a plurality of encryption algorithms therein;
a communications interface configured to receive data;
a random number generator;
a processor adapted to read from the memory one of the plurality of encryption algorithms, selected based on output of the random number generator;
wherein at least a portion of the logic defining the memory, the random number generator, and the processor is reconfigurable;
wherein the processor is also configured to encrypt the received data block based on the encryption algorithm read from the memory; and
wherein the selection of the encryption protocol is dynamically varied in response to a type of data input to the logic, the selection of the encryption protocol being based on a deterministic output of a pseudo random number generator.

20. The apparatus of claim 19, wherein the random number generator comprises a pseudo random number generator.

21. An apparatus for securing data based on protocol hopping and utilizing reconfigurable logic driven by a random number generator and protocols made available through a stream extension engine, comprising:

a memory containing data describing a plurality of encryption algorithms therein, wherein the plurality of encryption protocols mutually differ based on one or more characteristics selected from the group consisting of encryption algorithms, compression algorithms, and algorithmic parameters;

a communications interface configured to receive data;

a random number generator;

a processor adapted to read from the memory one of the plurality of encryption algorithms, selected based on output of the random number generator;

wherein at least a portion of the logic defining the memory, the random number generator, and the processor is reconfigurable;

wherein the processor is also configured to encrypt the received data block based on the encryption algorithm read from the memory; and wherein the selection of the encryption protocol is dynamically varied in response to a type of data input to the reconfigurable logic, the selection of the encryption protocol being based on a deterministic output of a pseudo random number generator.

22. The apparatus of claim 21, wherein the random number generator comprises a pseudo random number generator.

23. An apparatus for securing data based on protocol hopping and utilizing reconfigurable and non-reconfigurable logic driven by a random number generator and protocols made available through a stream extension engine, comprising:

a memory containing data describing a plurality of encryption algorithms therein, wherein the plurality of encryption protocols mutually differ based on one or more characteristics selected from the group consisting of encryption algorithms, compression algorithms, and algorithmic parameters;

a communications interface configured to receive data;

a random number generator;

a processor adapted to read from the memory one of the plurality of encryption algorithms, selected based on output of the random number generator;

wherein the processor is also configured to encrypt the received data block based on the encryption algorithm read from the memory;

wherein at least a portion of the logic defining the memory, the random number generator, and the processor is reconfigurable;

wherein another portion of the logic defining the memory, the random number generator, and the processor is non-reconfigurable; and wherein the selection of the encryption protocol is dynamically varied in response to a type of data input to the logic, the selection of the encryption protocol being based on a deterministic output of a pseudo random number generator.

24. The apparatus of claim 23, wherein the random number generator comprises a pseudo random number generator.

25. A process for securing data based on protocol hopping and utilizing reconfigurable logic, comprising:

selecting, in accordance with an algorithm implemented in reconfigurable logic, an encryption protocol from a plurality of encryption protocols stored on a memory;

encrypting, in accordance with the algorithm implemented in reconfigurable logic, data received via a communications port based on the selected encryption protocol;

repeating, in accordance with the algorithm implemented in reconfigurable logic, the selecting and encrypting steps to encrypt a plurality of data; and wherein the selection of the encryption protocol is dynamically varied in response to a type of data input to the reconfigurable logic, the selection of the encryption protocol being based on a deterministic output of a pseudo random number generator.

26. A process for securing data based on protocol hopping and utilizing reconfigurable logic driven by a random number generator, comprising:

selecting, in accordance with a protocol hopping algorithm implemented in reconfigurable logic, an encryption protocol from a plurality of encryption protocols stored on a memory based on the output of a random number generator;

encrypting, in accordance with the protocol hopping algorithm implemented in the reconfigurable logic driven by the random number generator, data received via a communications port based on the selected encryption protocol;

repeating, in accordance with the protocol hopping algorithm implemented in reconfigurable logic, the selecting and encrypting steps to encrypt a plurality of data; and wherein the selection of the encryption protocol is dynamically varied in response to a type of data input to the logic, the selection of the encryption protocol being based on a deterministic output of a pseudo random number generator.

27. The process of claim 26, wherein the selecting comprises:

selecting, in accordance with the algorithm implemented in reconfigurable logic, the encryption protocol from the plurality of encryption protocols stored on the memory based on the output of a pseudo random number generator.

28. A process for securing data based on protocol hopping and utilizing reconfigurable logic driven by a random number generator and protocols made available through a stream extension engine, comprising:

receiving data via a communications port;

making available on a memory a plurality of encryption protocols mutually differing based on one or more characteristics selected from the group consisting of encryption algorithms, compression algorithms, and algorithmic parameters;

selecting, in accordance with an algorithm implemented in reconfigurable logic, one of the plurality of encryption protocols stored on the memory based on the output of a random number generator;

encrypting, in accordance with the algorithm implemented in reconfigurable logic, the data block based on the selected encryption protocol;

repeating, in accordance with the algorithm implemented in reconfigurable logic, the selecting and encrypting steps to encrypt a plurality of data; and wherein the selection of the encryption protocol is dynamically varied in response to a type of data input to the logic, the selection of the encryption protocol being based on a deterministic output of a pseudo random number generator.

29. The process of claim 28, wherein the selecting comprises: .

selecting, in accordance with the algorithm implemented in reconfigurable logic, one of the plurality of encryption protocols stored on the memory based on the output of a pseudo random number generator.

30. A process for securing data based on protocol hopping and utilizing reconfigurable and non-reconfigurable logic driven by a random number generator and protocols made available through a stream extension engine, comprising:

receiving data via a communications port;

making available on a memory a plurality of encryption protocols mutually differing based on one or more characteristics selected from the group consisting of encryption algorithms, compression algorithms, and algorithmic parameters via the stream extension engine;

selecting, in accordance with a protocol hopping algorithm implemented in reconfigurable logic, one of the plurality of encryption protocols stored on the memory based on the output of a random number generator;

encrypting, in accordance with the protocol hopping algorithm implemented in reconfigurable logic, the data based on the selected encryption protocol;

repeating, in accordance with the algorithm implemented in reconfigurable logic, the selecting and encrypting steps to encrypt a plurality of data; and wherein the selection of the encryption protocol is dynamically varied in response to a type of data input to the reconfigurable logic, the selection of the encryption protocol being based on a deterministic output of a pseudo random number generator.

31. The process of claim 30, wherein the selecting comprises:

selecting, in accordance with the algorithm implemented in reconfigurable logic, one of the plurality of encryption protocols stored on the memory based on the output of a pseudo random number generator.

32. A method for achieving encrypted-communications compatibility of a first device with a second device, wherein the first device includes reconfigurable logic and is adapted to:

process data based on the reconfigurable logic and communicate with the second device;

wherein the method comprises:

storing, in the reconfigurable logic of the first device, one or more encryption protocols necessary for encrypted-communications compatibility with the second device, whereby encrypted-communications compatibility of the first device with the second device is achieved; and wherein a selection of the encryption protocol is dynamically varied in response to a type of data input to the logic, the selection of the encryption protocol being based on a deterministic output of a pseudo random number generator.

33. The method of claim 32, wherein design of the second device predates design of the first device, whereby the encrypted-communications compatibility comprises legacy compatibility.

34. The method of claim 32, wherein the first device and the second device are in use by a legal entity, whereby the encrypted-communications compatibility comprises cross-compatibility.

35. The method of claim 32, wherein the first device is in use by one legal entity and the second device is in use by a different legal entity, whereby the encrypted-communications compatibility comprises interoperability.

36. The method of claim 32, wherein design of the first device predates design of the second device, whereby the encrypted-communications compatibility comprises forward compatibility.

37. The method of claim 32, wherein each of the one or more encryption protocols is selected from the group consisting of encryption algorithms, compression algorithms, whitening algorithms, data manipulation algorithms, and modes.

38. The method of claim 32, wherein each of the one or more encryption protocols comprises an encryption algorithm.

39. The method of claim 32, wherein each of the one or more encryption protocols comprises a compression algorithm.

40. The method of claim 32, wherein each of the one or more encryption protocols comprises a whitening algorithm.

41. The method of claim 32, wherein each of the one or more encryption protocols comprises a data manipulation algorithm.

42. The method of claim 32, wherein each of the one or more encryption protocols comprises a mode.

* * * * *